United States Patent [19]

Lewis

[11] Patent Number: 5,772,898
[45] Date of Patent: Jun. 30, 1998

[54] HYDROCARBON CONVERSION PROCESS USING NOVEL METALLO MANGANESE OXIDES

[75] Inventor: Gregory J. Lewis, Mt. Prospect, Ill.

[73] Assignee: UOP LLC, Des Plaines, Ill.

[21] Appl. No.: 850,405

[22] Filed: May 2, 1997

Related U.S. Application Data

[63] Continuation-in-part of Ser. No. 468,891, Jun. 6, 1995, Pat. No. 5,637,545, which is a continuation-in-part of Ser. No. 360,516, Dec. 21, 1994, abandoned.

[51] Int. Cl.$^6$ .............................. C02F 1/68; C07C 41/01; C07C 45/00; C07C 255/00
[52] U.S. Cl. .......................... 210/762; 210/763; 558/462; 562/512.2; 568/399; 568/449; 568/671; 568/902; 585/435; 585/616
[58] Field of Search ..................................... 210/762, 763; 558/462; 568/449, 399, 671, 902; 562/512.2; 585/435, 616

[56] References Cited

U.S. PATENT DOCUMENTS

| 5,340,562 | 8/1994 | O'Young et al. | 423/599 |
| 5,578,282 | 11/1996 | O'Young et al. | 423/50 |

FOREIGN PATENT DOCUMENTS

| 581290 | 2/1994 | European Pat. Off. | 423/594 |
| WO 95/25693 | 9/1995 | WIPO . | |

OTHER PUBLICATIONS

Shen et al, "Octahedral Molecular Sievesi Preparation, Characterization and Applications," *J. Chem. Soc.*, Chem. Communications, Issue 17 (1992), pp. 1213–1214 (no month).

Stroebel and Charenton, *Revue de Chem. Minerale*, 23, 125 (1986).

Giovanoli and Faller, *Chimia*, 43, 54 (1989).

O'Young, *Synthesis of Microporous Materials*, M. Ocelli and H. Robson eds., Von Nostrand Reinhold, New York, vol. 2, p. 333 (1992).

Yin et al, *Inorg. Chem.*, 33, 4384 (1994).

Rossow et al, Mat. Re. Bull., 27, 221 (1992).

Tsuji et al, *J. Mater. Res.*, 8, 3145 (1993).

Post et al, *Acta Cryst.*, B38, 1056 (1982).

Byström and Byström in Acta Cryst., 3, 146 (1950).

Mukherjee in *Acta Cryst.*, 13, 164 (1960).

*Primary Examiner*—Wayne Langel
*Attorney, Agent, or Firm*—Thomas K. McBride; Frank S. Molinaro

[57] ABSTRACT

This invention relates to hydrocarbon conversion processes using a novel crystalline metallo manganese oxides that have the hollandite structure. The composition is represented by the formula $$A_y Mn_{8-x} M_x O_{16}$$

where A is a templating agent such as potassium, ammonium, and y varies from about 0.5 to about 2.0, M is a metal such as chromium, vanadium, gallium, antimony and x varies from about 0.01 to about 4.0. These oxides have a three-dimensional structure with manganese and the M metals forming the framework. Examples of the processes in which these compositions can be used are oxydehydrogenation and ammoxidation. These compositions are also effective for oxidizing cyanide in aqueous streams.

19 Claims, No Drawings

HYDROCARBON CONVERSION PROCESS USING NOVEL METALLO MANGANESE OXIDES

CROSS REFERENCE TO RELATED APPLICATION

This application is a continuation-in-part of application U.S. application Ser. No. 08/468,891 filed on 6 Jun. 1995 U.S. Pat. No. 5,637,545, which in turn is a continuation-in-part of U.S. application Ser. No. 08/360,516 filed Dec. 21, 1994, now abandoned, both of which are incorporated by reference.

FIELD OF THE INVENTION

This invention relates to processes using novel crystalline metal oxide compositions with the hollandite structure. The new compositions contain manganese and at least one other metal having a +3, +4 or +5 valence state in a three-dimensional framework structure. Examples of the processes include dehydrogenation and ammoxidation.

BACKGROUND OF THE INVENTION

The literature contains reports to various forms or structures of manganese oxide. One such structure is the hollandite structure which consists of octahedrally coordinated framework metal atoms and contains one-dimensional channels. To obtain charge neutrality, Group I or II metal cations or the ammonium cation are present in the channels. Stroebel and Charenton in *Revue de Chem. Minerale*, 23, 125 (1986) have reported on various structures of manganese oxide including hollandite structures with $K^+$, $Na^+$, $Rb^+$, $NH_4^+$, $Ba^{2+}$, and $Pb^{2+}$ in the tunnels, layered manganese oxides or phyllomanganates containing $Na^+$, $K^+$, $NH_4^+$ and $Cs^+$, psilomelane containing $Na^+$ or $Ba^{2+}$ and various Li manganates. These structures were prepared by oxidation of $Mn^{2+}$, reduction of $Mn^{7+}$, or transformation of $\beta$-$MnO_2$ under severe conditions. Giovanoli and Faller in *Chimia*, 43, 54 (1989) have reported the preparation of $K^+$, $Rb^+$, $Cs^+$, $Ca^{2+}$, $Sr^{2+}$, $Pb^{2+}$, or $Na^+$ hollandites by hydrothermal synthesis at 500° C. from $\gamma$-MnOOH. Further, the synthesis of $K^+$ manganese oxide hollandite via the hydrothermal conproportionation of $Mn^{2+}$ and $MnO_4$ at temperatures of about 100° C. and pH of less than 2 has been reported by O'Young in *Synthesis of Microporous Materials*, M. Ocelli and H. Robson eds., Von Nostrand Reinhold, New York, Vol 2, p. 333 (1992). Yin et al. in *Inorg. Chem.*, 33, 4384 (1994) have prepared manganese oxide with the hollandite structure in which $Ni^{2+}$, $Ca^{2+}$ or $Fe^{3+}$ are present in the tunnels. Hollandite manganese oxide with $Li^+$ or $H^+$ in the tunnels have been prepared. See Rossow et al., *Mat. Re. Bull.*, 27, 221 (1992) and Tsuji et al., *J. Mater. Res.*, 8, 3145 (1993). Post et al. in *Acta Cryst.*, B38, 1056 (1982) have reported on the structures of minerals having the hollandite structure, including $((Ba_{0.75}Pb_{0.16}Na_{0.10}K_{0.04})(Mn,Fe,Al)_8(O,OH)_{16})$ and $((K_{0.94}Na_{0.25}Sr_{0.13}Ba_{0.10})(Mn,Fe,Al)_8(O,OH)_{16})$. Byström and Byström in *Acta Cryst.*, 3, 146 (1950) have reported on manganese oxide minerals with the hollandite crystal structure. The materials contain manganese, iron, titanium and aluminum. Finally, Mukherjee in *Acta Cryst.*, 13, 164 (1960) presents the space group and cell dimensions of a material having the formula $BaFeMn_7O_{16}$.

Applicant has discovered a new class of compositions based on manganese oxide and at least one other metal oxide. These compositions have a three dimensional structure with manganese and at least one other metal, e.g., chromium, vanadium, gallium, antimony forming the framework. The metallo manganese oxides of this invention are capable of catalyzing hydrocarbon conversion reactions such as oxidation and oxidative dehydrogenation. Applicant has further found that these new compositions can be used in various hydrocarbon conversion process such as dehydrogenation and ammoxidation.

SUMMARY OF THE INVENTION

One embodiment of the invention is a hydrocarbon conversion process comprising contacting a hydrocarbon feed with a catalyst under hydrocarbon conversion conditions to give a converted product, the catalyst comprising a crystalline metallo manganese oxide composition having a three-dimensional framework structure, an intracrystalline pore system and an empirical chemical composition on an anhydrous basis expressed by the formula:

$$A_y Mn_{8-x} M_x O_{16}$$

where A is a templating agent selected from the group consisting of alkali metals, alkaline earth metals, and ammonium ion, "y" is the number of moles of A and varies from 0.5 to 2.0, M is a metal selected from the group consisting of chromium zirconium, tin, platinum, rhodium, niobium, tantalum, vanadium, antimony, ruthenium gallium and germanium, "x" is the moles of M and varies from about 0.01 to about 4.00 and characterized in that manganese has a valence of +3 or +4, M has a valence of +3, +4 or +5, and the composition has the hollandite structure.

Another embodiment of the invention is a hydrocarbon conversion process comprising contacting a hydrocarbon feed with a catalyst under hydrocarbon conversion conditions to give a converted product, the catalyst comprising a crystalline metallo manganese oxide composition having a three-dimensional framework structure, an intracrystalline pore system and an empirical chemical composition on an anhydrous basis expressed by the formula $$A_y Mn_{8-x} M1_r M2_s O_{16}$$

where A is a templating agent selected from the group consisting of alkali metals, alkaline earth metals and ammonium ion, "y" is the moles of A and varies from about 0.5 to about 2.0, M1 is a metal selected from the group consisting of aluminum, iron, titanium and mixtures thereof, M2 is a metal selected from the group consisting of zirconium, tin, platinum, rhodium, niobium, tantalum, vanadium, antimony, ruthenium, gallium germanium, and mixtures thereof, "r" and "s" are the moles of M1 and M2 respectively and r+s=x; "x" varies from 0.01 to 4.0; "h" and "k" represent the moles of a +3 and a +4 M1 metal respectively and h+k=r and the relative moles of M1 and M2 are described by:

(i) when M2 is a +3 metal or a combination of a +3 and a +4 metal and "v" and "t" are the moles of the +3 and +4 metals respectively and v+t=s, then h+v<1.25;

(ii) when M2 is a +4 metal, then h<1.25;

(iii) when M2 is a +5 or a mixture of a +4 and a +5 metal and "t" and "u" are the moles of the +4 and +5 metals respectively and t+u=s, then h−u<1.25 when h>u; u−h<1.0 when u>h, (iv) M2 is a mixture of a +3, +4 and a +5 metal and "v", "t" and "u" are the moles of the +3, +4 and +5 metal respectively and v+t+u=s, then (h+v)−u>1.25 when (h+v)>u;

u−(h+v)<1.0 when u>(h+v), and the composition has the hollandite structure.

These and other objects and embodiments of the invention will become more apparent after a more detailed description of the invention.

DETAILED DESCRIPTION OF THE INVENTION

As stated, the instant invention relates to hydrocarbon conversion processes using crystalline metallo manganese oxide compositions. The compositions have an empirical chemical composition on an anhydrous basis expressed by the formula:

$$A_y Mn_{8-x} M_x O_{16}$$

where A is a templating agent selected from alkali metals, alkaline earth metals, and ammonium ion, "y" is the number of moles of A and varies from 0.5 to 2.0, M is at least one metal having a +3, +4 or +5 valence and is selected from the group consisting of chromium, zirconium, tin, platinum, rhodium, niobium, tantalum, gallium, ruthenium, germanium, antimony, vanadium, and mixtures thereof and "x" is the moles of M and varies from about 0.01 to about 4. The value of x, i.e., the amount of M which is incorporated into the three-dimensional framework, will vary depending on what M is. Thus, when M is rhodium, gallium, chromium, or mixtures thereof, "x" varies from about 0.01 to about 1.25. When M is niobium, tantalum, vanadium, antimony or mixtures thereof, "x" varies from about 0.01 to about 1.0. Finally, when M is zirconium, tin, platinum, ruthenium, germanium and mixtures thereof, "x" varies from about 0.01 to about 4.0.

If a mixture of metals is desired, the relative amount of each metal needs to be controlled in order to balance the charge on the framework. In this case the above empirical formula is represented by $$A_y Mn_{8-x} M^{3+}{}_d M^{4+}{}_e M^{5+}{}_f O_{16}$$

where "d", "e" and "f" represent the moles of $M^{3+}$, $M^{4+}$ and $M^{5+}$ respectively and d+e+f=x. The amount of each metal present in the mixture is governed by the following equations:

(i) when f=0; d+e=x and d<1.25;

(ii) when e=0; d+f=x; d−f<1.25 when d>f; f−d<1.0 when f>d;

(iii) when d=0; e+f=x and f<1.0;

(iv) d+e+f=x; d−f<1.25 when d>f, f−d<1.0 when f>d.

In another embodiment of the invention, the compositions of the invention are represented by the empirical formula $$A_y Mn_{8-x} M1_r M2_s O_{16}$$

where A, "y" and "x" are the same as defined above. M1 is a metal selected from the group consisting of aluminum, iron, titanium and mixtures thereof, M2 is a metal selected from the group consisting of chromium, zirconium, tin, platinum, rhodium, niobium, tantalum, vanadium, antimony, ruthenium, gallium, germanium, and mixtures thereof, and r and s are the moles of M1 and M2 respectively, and r+s=x. Since M1 and M2 have valences of +3, +4 or +5, the relative amounts of each metal is limited for the same reasons as stated above. Since M1 can be a +3, +4 or a combination of a +3 and a +4 metal, the relative moles of the +3 and +4 M1 metals is represented by "h" and "k" respectively with h+k=r. The amounts of the M1 and M2 metals are determined by the following equations:

(i) when M2 is a +3 metal or a combination of a +3 and a +4 metal and "v" and "t" are the moles of the +3 and +4 metals respectively and v+t=s, then h+v<1.25;

(ii) when M2 is a +4 metal then h<1.25;

(iii) when M2 is a +5 metal or a combination of a +4 and a +5 metal and "t" and "u" are the moles of the +4 and +5 metals respectively and t+u=s, then h−u<1.25 when h>u; u−h<1.0 when u>h;

(iv) when M2 is a mixture of a +3, +4 and a +5 metal and "v", "t" and "u" are the moles of the +3, +4 and +5 metal respectively and v+t+u=s, then (h+v)−u>1.25 when (h+v)>u; u−(h+v)<1.0 when u>(h+v).

These metallo manganese oxide compositions have a three-dimensional framework structure of $MnO_{6/3}$ and $MO_{6/3}$ octahedral units. Further, these compositions have an intracrystalline pore system in which the free pore diameter is about 2.4 Angstroms. Finally, these compositions have the hollandite crystal structure.

The instant metallo manganese oxide compositions are prepared by hydrothermal crystallization of a reaction mixture containing reactive sources of the necessary components. The metallo manganese oxide compositions which can be prepared by the following process encompasses a broader group than those defined above. These compositions are represented by the empirical formula $$A_y Mn_{8-x} M3_x O_{16}$$

where y and x are as defined above and M3 is a metal selected from the group consisting of titanium, zirconium, aluminum, chromium, tin, platinum, rhodium, niobium, tantalum, vanadium, antimony, ruthenium, gallium, germanium, iron, and mixtures thereof.

The reaction mixture used to prepare these compositions is represented by the following formula expressed in terms of molar ratios of the oxides:

$$xA_{2/n}O : yMnO_{p/2} : zM3O_{q/2} : aH_2O : bT$$

where "n" is the valence of A and has a value of +1 or +2, "x" ranges from about 3 to about 24, "y" ranges from about 4 to about 8, "z" ranges from about 0.01, to about 4.0, "a" ranges from about 200 to about 2000, "b" ranges from greater than 0 to about 80, and "p" and "q" are the valences of Mn and M3 respectively, "p" can have values of +2 or +7, while "q" has the values of +3, +4 or +5, and T is an oxidizing or reducing agent for adjusting the oxidation state of manganese.

The manganese source can be any manganese salt or manganese oxide. Examples of manganese salts are $KMnO_4$, $Ba(MnO_4)_2$, $NaMnO_4$, $NH_4MnO_4$, $HMnO_4$, $Mg(MnO_4)_2$, $Mn(NO_3)_2 \cdot 6H_2O$, and $MnSO_4 \cdot H_2O$. The alkali metals, alkaline metals and ammonium components can be introduced as a part of the manganese or M source or can be added as a separate component. When added as a separate component, sources of the alkali or alkaline earth metals include the sulfate, acetate, nitrate, formate, carbonate, and hydroxide salts. Specific examples include sodium sulfate, sodium nitrate, sodium acetate, sodium carbonate, sodium hydroxide, lithium sulfate, lithium nitrate, lithium carbonate, lithium hydroxide, rubidium nitrate, rubidium carbonate, rubidium hydroxide, rubidium sulfate, cesium sulfate, cesium nitrate, cesium carbonate, cesium hydroxide, potassium sulfate, potassium formate, potassium nitrate, potassium carbonate, potassium hydroxide, magnesium nitrate, magnesium carbonate, magnesium hydroxide, calcium nitrate, calcium hydroxide, calcium carbonate, barium nitrate, barium carbonate, barium hydroxide, strontium nitrate, strontium carbonate and strontium hydroxide. Sources of ammonium cation include ammonium sulfate or ammonium nitrate. Finally, sources of the M metal include $Na_2PtCl_6 \cdot 6H_2O$, $Al(NO_3)_3 \cdot 9H_2O$, $TiCl_3$, $TiCl_4$, $TiOSO_4 \cdot H_2SO_4 \cdot 8H_2O$, $(NH_4)_2TiF_6$, $ZrO(NO_3)_2$, $Fe(NO_3)_3 \cdot 9H_2O$, $SnCl_4 \cdot 5H_2O$, $SnF_4Ga(NO_3)_3$, $Cr(NO_3)_3 \cdot 9H_2O$, $K_2Cr_2O_7$, $(NH_4)_2SbF_5$, $Rh(NO_3)_3 xH_2O$, $Nb_2O_5 xH_2O$, $NbF_5$, $TaF_5$, $(NH_4)_2GeF_6$, $VOSO_4 \cdot 3H_2O$, and $RuCl_3$.

Another component of the reaction mixture is a compound which is used to adjust the oxidation state of manganese, i.e., an oxidizing or reducing agent (T). Illustrative examples of these compounds are $KHCO_2$, $H_2O_2$, $CH_3COOH$, $K_2S_2O_8$, $NH_4CHO_2$, $KC_2H_3O_2$, $Ba(HCO_2)_2$ and $(NH_4)_2S_2)_8$.

Once the reaction mixture is prepared, it is preferred that the pH of the mixture is adjusted to a value of about 0.5 to about 5. This is accomplished by adding an acid such as nitric, sulfuric, or acetic acid (preferably acetic acid). Additionally, the oxidation state of the reactive source of manganese is different from the final oxidation state of manganese in the metallo manganese oxide and thus must be adjusted. As stated above, one way to accomplish this is to use an optional oxidizing or reducing agent. Another way to adjust the oxidation state is via a reaction of the M metal source and Mn source. For example, the metal in $VOSO_4 \cdot 3H_2O$, $TiCl_3$ or $(NH_4)_2SbF_5$ can be oxidized to a higher oxidation state while the manganese is reduced (usually from +7 to +4). When this reaction occurs, a compound such as acetic acid is often still necessary both as a reducing agent and as a transporting or mineralizing agent. Alternatively, the ligands of the M source may act as a reducing agent. For example, the chloride in compounds such as $Na_2PtCl_6 \cdot 6H_2O$ or $SnCl_4 \cdot 5H_2O$ can act as a reducing agent. Finally, two sources of manganese with different oxidation states can react to arrive at the desired oxidation state. An example of this is using $KMnO_4$ and $Mn(NO_3)_2$.

It is also desirable to add a mineralizer to the mixture in order to enhance the solution chemistry and increase the crystallinity of the products. Examples of mineralizers which perform these functions are acetic acid or HF.

Having formed the reaction mixture, it is next reacted at a temperature of about 80° C. to about 200° C., preferably from about 80° C. to about 125° C. for a period of about 5 hours to about 168 hours (7 days) and preferably from about 16 hours to about 70 hours. The reaction is carried out under atmospheric pressure or the reaction vessel may be sealed and the reaction run at autogenous pressure. In a preferred embodiment the manganese source is $KMnO_4$, the reductant, mineralizer and pH adjuster is acetic acid, the temperature is from about 100° C. to about 105° C. and the time required to crystallize the product is from about 16 hours to about 24 hours. It is preferred that the ratio of oxides in the reaction mixture be in the range of 10 Mn: 1M.

As stated, one function of the alkali metals, alkaline earth metals and ammonium ion is to act as a structure directing agent. However not all the structure directing agents which can be used to prepare certain species of metallo manganese oxides are suitable for the preparation of all members of the generic class. The relationship of specific structure directing agent to the individual product species is apparent from the illustrative examples set forth herein. Mixtures of the metals and/or ammonium ion can also be used as structure directing agents. Again the mixtures may provide some structures but not necessarily all the structures or members of the generic class.

Since the alkali metals, alkaline earth metals and ammonium ions are acting as structure directing agents, when the metallo manganese oxide composition is synthesized, a portion of the structure directing agent will be present in the pores of the oxide. Once the metallo manganese oxide is formed, the structure directing agent within the pores of the oxide acts as a counter ion to the negative framework charge. If it is desirable to have a metallo manganese oxide substantially free of alkali/alkaline earth metal cations, then ammonium ions must be used in the reaction mixture. However, because of the framework charge, some counter ion must always be present.

These crystalline compositions can be used as catalysts in various processes in which hydrocarbons are one of the reactants, i.e., hydrocarbon conversion processes. One such process is oxidative dehydrogenation (or oxydehydrogenation), such as dehydrogenation of propane to propylene or alkyl aromatic compounds to alkenyl aromatic compounds. The process generally involves contacting the hydrocarbon with the composition of this invention at oxydehydrogenation conditions. Oxydehydrogenation conditions for alkanes include a temperature of about 150° C. to about 350° C., an hourly space velocity (HSV) of about 200 to about 20,000 $hr.^{-1}$, a pressure of about atmospheric to about 1034 kPa (150 psi) and an oxygen to hydrocarbon ratio of about 0.5:1 to about 5:1. The oxydehydrogenation of alkylaromatic compounds is disclosed in U.S. Pat. No. 4,180,690 which is incorporated by reference. Conditions for the oxydehydrogenation of alkylaromatic compounds include a temperature of about 470° C. to about 600° C., an HSV of about 0.5 to about 10 $hr^{-1}$, a pressure of atmospheric and an oxygen to hydrocarbon ratio of about 0.5:1 to about 2:1.

Another process is ammoxidation of hydrocarbon and in particular ammoxidation of propane or propylene to acrylonitrile. Conditions for ammoxidation may be found in the art and specifically in U.S. Pat. Nos. 4,788,173; 5,171,876 and 5,049,692 all of which are incorporated by reference. General conditions include a temperature of about 350° C. to about 700° C., an HSV of about 100 to about 10,000 $hr^{-1}$, an ammonia to alkane ratio of about 0.5:1 to about 3:1, an oxygen to ammonia ratio of about 0.5:1 to about 10:1 and a pressure of atmospheric to about 1034 kPa (150 psi).

Yet another hydrocarbon conversion process is the oxidation of alcohols to ketones which can be carried out at temperatures of about 150° C. to about 350° C., an HSV of about 200 $hr^{-1}$ to about 20,000 $hr^{-1}$, a pressure of atmospheric to about 1034 kPa (150 psi) and an oxygen to alcohol ratio of 0.5:1 to about 5:1.

Other hydrocarbon conversion processes include conversion of hydrocarbons to alcohols, ethers, aldehydes, ketones or acid anhydrides; conversion of alcohols to aldehydes, or carboxylic acids.

The compositions of this invention are also capable of oxidizing cyanide from aqueous streams. It is well known that inorganic water soluble cyanides pose a danger to human, plant, and animal life. The complete oxidation of cyanide has been documented and is disclosed in U.S. Pat. Nos. 5,273,633; 5,376,285 and 5,476,596 all of which are incorporated by reference. These references describe the oxidation of cyanides under acidic oxidation conditions. The process generally involves contacting the aqueous stream to be treated, with a catalyst in the presence of an oxiding agent, such as oxygen, under acidic oxidation conditions. Acidic oxidation conditions include a temperature of about 20° C. to about 150° C., a pH of about 1 to about 6 and a pressure of atmospheric to about 2026 kPa (20 atm). The process can be carried out either in a batch mode or continuously. The oxidizing agent, e.g., oxygen is usually present in excess quantities and is usually introduced as a separate gaseous stream. This process provides a product aqueous stream with a greatly reduced concentration of cyanide.

The structure of the metallo manganese oxides of this invention was determined by x-ray analysis. The x-ray patterns were obtained using standard x-ray powder diffraction techniques. The radiation source is a high-intensity, copper target, x-ray tube operated at 45 Kv and 25 ma. The diffraction pattern from the copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as w=0–15; m=15–60; s=60–80 and vs =80–100.

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the variety of species to be derived from the instant invention, the following examples are set forth. It is to be understood that the examples are only by way of illustration and are not intended as an undue limitation on the broad scope of the invention as set forth in the appended claims. The first two examples illustrate the application of the methods described in this application to obtain known manganese hollandite species.

EXAMPLE 1

$KMnO_4$ (1050 g) was suspended in 14000 g distilled water in a 22-liter flask equipped with a motorized stirrer and reflux condenser. Glacial Acetic Acid (1196 g) was added to the stirring suspension and the resulting mixture was heated to reflux for 2 days, during which the initially dark purple solution became a fluffy brown solid. The solid product was filtered, washed with distilled water and dried at room temperature. X-ray diffraction (XRD) analysis showed the product to be isostructural with the hollandite structure, more specifically the potassium form cryptomelane. Scanning Electron Microscopy (SEM)/Energy Dispersive Analysis by X-rays (EDAX) showed the product to consist of uniform fiber-like crystals containing the metals K and Mn. Elemental analysis showed the metals to be present in the mole ratios $K_{1.12}Mn_{8.00}$, consistent with the formulation for the hollandite structure. Representative XRD data are given in Table 1.

TABLE 1

| 2θ | d-(Å) | Intensity |
|---|---|---|
| 12.68 | 6.98 | s |
| 18.00 | 4.92 | s |
| 28.67 | 3.11 | w |
| 37.51 | 2.40 | vs |
| 41.91 | 2.15 | m |
| 49.76 | 1.83 | m |
| 56.08 | 1.64 | w |
| 60.07 | 1.54 | m |
| 65.28 | 1.43 | w |

EXAMPLE 2

10.00 g $Ba(MnO_4)_2$ was dissolved in 70.0 g distilled water. A second solution was prepared by dissolving 5.28 g $(NH_4)_2SO_4$ in 58.3 g distilled water and added to the first solution to precipitate $BaSO_4$. An additional 50.0 g distilled water was added and the reaction mixture was stirred vigorously. The purple solution was then filtered from the white $BaSO_4$ precipitate, placed in a round-bottom flask and 9.60 g of glacial acetic acid added to the purple solution. The flask was next fitted with a reflux condenser and the solution refluxed for 17 hours.

The product was a fluffy brown solid, which was filtered from a colorless mother liquor, washed thoroughly with distilled water, and dried at room temperature. Characterization by XRD showed a diffraction pattern consistent with the hollandite structure. SEM data showed the product to consist of uniform fiber-like crystals of sub-micron diameters and lengths up to 30 microns, while EDAX data indicated Mn to be the only metal present, implying the product is the $NH_4^+$—containing hollandite, $NH_4Mn_8O_{16}$. Representative XRD data is shown in Table 2.

TABLE 2

| 2θ | d(Å) | Intensity |
|---|---|---|
| 12.65 | 7.00 | vs |
| 17.97 | 4.94 | m |
| 28.61 | 3.12 | m |
| 37.53 | 2.40 | m |
| 41.87 | 2.16 | m |
| 49.66 | 1.84 | m |

EXAMPLE 3

$KMnO_4$ (40.00 g) was suspended in 280.0 g distilled water in a 1-L flask equipped with a motorized stirrer. Separately, $Fe(NO_3)_3 \cdot 9H_2O$ (5.13 g) was dissolved in 40.00 g distilled water. Glacial Acetic Acid (36.00 g) was added to the ferric nitrate solution, while 9.60 g glacial acetic acid was added to the permanganate suspension. After the solutions were stirred for 10 minutes, the ferric nitrate/acetic acid solution was added to the permanganate suspension, and the pH of the resulting mixture was adjusted to 1.89 via the addition of 6.00 g concentrated nitric acid. A reflux condenser was attached to the flask and the solution was refluxed for 13 hours.

The reaction products consisted of a brown solid and a colorless mother liquor which had a pH of 4.50. The mother liquor was filtered away from the solid, which was washed thoroughly with distilled water and dried at room temperature. Optical Microscopy showed the product crystals consisted of aggregates of sub-micron to micron-sized fibers, a morphology often observed for hollandite crystals. The XRD data indicated the structure of the product to be the hollandite structure. Elemental analysis showed the metals to be present in the mole ratios $K_{1.15}Fe_{0.39}Mn_{7.61}$, consistent with formulation for the hollandite structure. Representative XRD data are given in Table 3.

TABLE 3

| 2θ | d(Å) | Intensity |
| --- | --- | --- |
| 12.83 | 6.89 | m |
| 18.16 | 4.88 | m |
| 28.81 | 3.10 | s |
| 37.63 | 2.39 | vs |
| 41.98 | 2.15 | m |
| 49.76 | 1.83 | m |
| 56.08 | 1.64 | w |
| 60.07 | 1.54 | m |
| 65.28 | 1.43 | w |

EXAMPLE 4

$KMnO_4$ (40.00 g) was suspended in 280.0 g distilled water in a 1-L flask equipped with a motorized stirrer, and glacial acetic acid (9.60 g) was added to the stirring permanganate suspension. Separately, 14.60 g $Fe(NO_3)_3 \cdot 9H_2O$ was dissolved in 62.0 g distilled water. Glacial acetic acid (36.0 g) was added to the ferric nitrate solution, stirred for 10–15 minutes and then added to the permanganate suspension. The pH was adjusted to 1.90 via the addition of 4.50 g concentrated nitric acid. The flask was then fitted with a condenser and the reaction mixture was refluxed for 27 hours.

The products consisted of a dark brown solid and a colorless mother liquor which had a pH of 4.70. The solid was filtered from the mother liquor, washed thoroughly with distilled water, and dried at room temperature. The XRD data showed the product to be isostructural to hollandite. Elemental analysis showed the mole ratios of the metals to be $K_{1.06}Fe_{1.02}Mn_{6.98}$, consistent with the formulation for the hollandite structure. Representative XRD data are shown in Table 4.

TABLE 4

| 2θ | d(Å) | Intensity |
| --- | --- | --- |
| 12.74 | 6.94 | m |
| 18.05 | 4.91 | m |
| 28.71 | 3.11 | s |
| 37.46 | 2.40 | vs |
| 41.84 | 2.16 | m |
| 49.68 | 1.83 | m |
| 56.08 | 1.64 | w |
| 60.04 | 1.54 | m |
| 65.05 | 1.43 | w |

EXAMPLE 5

$KMnO_4$ (15.0 g) was suspended in 150 g distilled water with stirring and 11.39 g glacial acetic acid was added to this suspension. Separately, a solution was prepared by dissolving 7.61 g $Na_2PtC_{4.6}H_2O$ in 50.0 g distilled water and placed in a buret. The permanganate/acetic acid suspension was then slowly heated to 65° C. while the platinate solution was added dropwise with the buret. The reaction mixture became darker during the platinate addition and was held at 65° C. with vigorous stirring once the addition was complete. The pH of the solution at this temperature was 2.74. The hot reaction mixture was distributed among 9 Teflon-lined autoclaves and digested at 100° C., 150° C., and 200° C. at autogenous pressure for time periods of 2–8 days.

The products were filtered from their mother liquors, which had pH's in the range of 4.5 to 4.8, depending on the particular conditions. The products were then washed and air-dried. The reactions from the 100° C. reactions were dark brown and XRD data showed them to be isostructural with the hollandite structure. SEM/EDAX data showed a uniform material of consistent composition containing the metals K, Mn, and Pt. Representative XRD data are given in Table 5.

TABLE 5

| 2θ | d-(Å) | Intensity |
| --- | --- | --- |
| 12.58 | 7.03 | vs |
| 18.07 | 4.91 | m |
| 28.74 | 3.10 | m |
| 37.54 | 2.39 | m |
| 41.93 | 2.15 | w |
| 49.80 | 1.83 | w |
| 56.08 | 1.64 | w |
| 60.13 | 1.54 | m |
| 65.57 | 1.42 | w |

EXAMPLE 6

$KMnO_4$ (25.00 g) and $K_2Cr_2O_7$ (5.82 g) were suspended with stirring in 356 g distilled water in a 1-L beaker. The suspension was heated on a hot-plate to help dissolve the solids. Glacial acetic acid (19.00 g) was added to the stirring mixture and heating continued until the temperature reached 65° C. The pH of the reaction mixture at this time was 3.12. The warm reaction mixture was distributed among six Teflon-lined autoclaves and digested at either 100° C. or 150C for 2–10 days.

The products of the 100° C. reactions consisted of green-brown solids and yellow mother liquors. The color of the mother liquors were indicative of unreacted dichromate. The average pH of the product mother liquors was 5.50. The green-brown solids were filtered from the mother liquors, washed thoroughly with distilled water, and air-dried. XRD data showed the green-brown material to be isostructural to hollandite. SEM/EDAX data showed the product to consist of micron-length fibrous crystals of constant composition, containing the metals K, Cr, and Mn. Elemental analysis showed the mole ratios of the metals to be $K_{1.13}Cr0.46Mn_{7.54}$, consistent with the formulation of the hollandite structure. Representative XRD data are given in Table 6.

TABLE 6

| 2θ | d(Å) | Intensity |
| --- | --- | --- |
| 12.74 | 6.94 | s |
| 18.09 | 4.90 | s |
| 28.76 | 3.10 | vs |
| 37.51 | 2.40 | vs |
| 41.92 | 2.15 | m |
| 49.80 | 1.83 | m |
| 56.16 | 1.64 | w |
| 60.19 | 1.54 | m |
| 65.19 | 1.43 | w |

EXAMPLE 7

$KMnO_4$ (40.00 g) was suspended in 280 g distilled water in a 1-L flask equipped with a motorized stirrer. Glacial acetic acid (9.00 g) was added to the stirring permanganate suspension. Separately, 5.06 g $Cr(NO_3)_3 \cdot 9H_2O$ was dissolved in 40.5 g distilled water and 36.60 g glacial acetic acid was added to this solution and stirred for 15–30 minutes. The $Cr^{3+}$/acetic acid solution was then added to the stirring permanganate suspension and the pH was adjusted to 1.98 via the addition of 9.00 g concentrated nitric acid. A condenser was attached to the flask and the reaction mixture was refluxed with stirring for 25 hours.

The products consisted of a green-brown solid and a light green mother liquor, which had a pH of 4.60. The solids were filtered, washed with distilled water, and air-dried. Optical microscopy showed the sample to consist of submicron sized fibers typical of many hollandite samples. XRD data showed the product to be isostructural with hollandite. Representative XRD data is presented in Table 7.

TABLE 7

| 2θ | d(Å) | Intensity |
|---|---|---|
| 12.77 | 6.93 | s |
| 18.08 | 4.90 | m |
| 28.75 | 3.10 | s |
| 37.60 | 2.39 | vs |
| 42.01 | 2.15 | m |
| 49.84 | 1.83 | m |
| 56.16 | 1.64 | w |
| 60.13 | 1.54 | m |
| 65.28 | 1.43 | w |

EXAMPLE 8

To a 1-L flask containing 185 g distilled water there were added 40.0 g $KMnO_4$, followed by an additional 100.0 g distilled water. While the resulting suspension was stirred with a motorized stirrer, 22.80 g of glacial acetic acid were added. In a separate vessel, 4.74 g $Al(NO_3)_3 \cdot 9H_2O$ were dissolved in 40.0 g distilled water and 22.80 g glacial acetic acid was added to the resulting solution. The solutions were stirred for 15 minutes before the aluminum nitrate/acetic acid solution was added to the permanganate suspension. The pH of the reaction mixture was 2.70. A condenser was attached to the 1-L flask and the reaction mixture was refluxed for 18 hours.

The products were a colorless mother liquor with a pH of 4.93 and a fluffy brown solid. The solids were filtered, washed with distilled water, and air-dried. XRD data showed that the product had the hollandite structure. Elemental analysis showed the metals to be present in the mole ratios $K_{1.15}Al_{0.41}Mn_{7.59}$, consistent with the formulation for the hollandite structure. Representative XRD data are given in Table 8.

TABLE 8

| 2θ | d(Å) | Intensity |
|---|---|---|
| 12.71 | 6.96 | s |
| 18.02 | 4.92 | s |
| 28.70 | 3.11 | vs |
| 37.54 | 2.39 | vs |
| 41.94 | 2.15 | m |
| 49.81 | 1.83 | m |
| 56.14 | 1.64 | w |
| 60.14 | 1.54 | m |
| 65.32 | 1.43 | w |

EXAMPLE 9

$KMnO_4$ (25.00 g) was suspended in 230.0 g distilled water, and 28.50 g glacial acetic acid was added to this suspension. The resulting mixture was heated to 53° C. to help dissolve all of the permanganate. In a separate vessel, 5.93 g $Al(NO_3)_3 \cdot 9H_2O$ and 3.41 g $VOSO_4 \cdot 3.82H_2O$ were dissolved in 55.0 g distilled water, and the solution placed in a buret. The permanganate/acetic acid solution temperature was adjusted to 45° C. and the aluminum nitrate/vanadium sulfate solution was added dropwise. The resultant mixture had a pH of 2.60. A portion of the mixture was placed in a Teflon® lined autoclave and heated to 125° C. for 70 hours. The product of this reaction was a dark brown solid. Optical microscopy showed that the product consisted of clumps of birefringent submicron fibers. Elemental analysis showed the metals to be present in the mole ratios $K_{0.723}Al_{0.741}Mn_{6.650}V_{0.609}$ consistent with the formulation for the hollandite structure. Representative XRD data are given in Table 9.

TABLE 9

| 2θ | d(Å) | Intensity |
|---|---|---|
| 12.75 | 6.94 | vs |
| 18.08 | 4.90 | s |
| 28.75 | 3.10 | vs |
| 37.58 | 2.39 | vs |
| 41.99 | 2.15 | m |
| 49.84 | 1.83 | m |
| 56.14 | 1.63 | w |

EXAMPLE 10

In a container there were mixed 25.00 g of $KMnO_4$, 200.0 g of distilled water and 28.50 g of glacial acetic acid. The resultant suspension was gently heated to dissolve the $KMnO_4$. In a separate container 4.88 g of $VOSO_4 \cdot 3.82H_2O$ was dissolved in 28.04 g distilled water and the resultant solution was placed in a buret. The vanadium solution was added dropwise to the manganese solution (at 40° C.) and the resultant mixture was stirred for 10 minutes before heating to 60° C. A portion of this mixture was placed in a Teflon® lined autoclave and heated at 125° C. for 3 days at autogenous pressure. The solid product which was dark brown was filtered, washed with water and dried in air. Elemental analysis showed the metals to be present in the mole ratios $K_{1.016}V_{0.797}Mn_{7.203}$ consistent with the hollandite structure. Representative XRD data are given in Table 10.

TABLE 10

| 2θ | d-(Å) | Intensity |
|---|---|---|
| 12.70 | 6.96 | s |
| 18.01 | 4.92 | s |
| 28.68 | 3.11 | vs |
| 37.52 | 2.40 | vs |
| 41.91 | 2.15 | m |
| 49.70 | 1.83 | m |
| 55.93 | 1.64 | w |
| 60.06 | 1.54 | m |
| 67.31 | 1.39 | w |

EXAMPLE 11

$TiOSO_4 \cdot H_2SO_4 \cdot 8H_2O$ (1272 g) was suspended in 135 g distilled water to which 25.0 g concentrated $H_2SO_4$ was added. This mixture was stirred vigorously to form a white sol. Separately $KMnO_4$, 25.0 g, was suspended in 150 g distilled water, 28.50 g glacial acetic acid was added, and the mixture was heated to 85° C. with stirring. At this point the titanyl sulfate sol was added quickly to the $KMnO_4$/acetic acid solution with vigorous stirring and the heat was reduced. After stirring for a few minutes, the pH of the reaction mixture was 0.85 at a temperature of 80° C. The warm reaction mixture was placed in nine Teflon-lined autoclaves and digested at 100° C., 150° C., and 200° C. at autogenous pressure for time periods of 57 hours to 1 week.

The products were dark brown solids which were filtered, washed with distilled water and air-dried. XRD data showed that all of the products isolated from the 100° C. digestions were isostructural with the hollandite structure. SEM data showed the 100° C. product to consist of aggregates of submicron particulates which are in turn composed of very small fiber crystals packed together. EDAX data showed that the 100° C. products contained the metals K, Mn, and Ti in uniform ratios throughout the sample. Representative d-spacings from the XRD data are given in Table 11.

TABLE 11

| 2θ | d-(Å) | Intensity |
|---|---|---|
| 12.68 | 6.97 | vs |
| 17.98 | 4.93 | vs |
| 28.61 | 3.12 | vs |
| 2.40 | 2.40 | vs |
| 41.82 | 2.16 | m |
| 49.66 | 1.83 | m |
| 55.88 | 1.64 | m |
| 59.93 | 1.54 | m |
| 65.28 | 1.43 | w |

EXAMPLE 12

$KMnO_4$ (25.00 g) was suspended in 225.0 g distilled water and heated to 75° C. to dissolve all solids. When the temperature reached 75° C., the heat was reduced being careful to keep the solution warm. In a separate vessel, 28.50 g glacial acetic acid was diluted with 60.0 g distilled water. $SnF_4$ (4.40 g) was added to this solution and stirred, forming a solution/sol that was stirred for 10 minutes. The tin fluoride/acetic acid sol was now added to the warm permanganate solution and the resulting mixture stirred for about 30 minutes. After stirring, the reaction mixture had a pH of 2.10 at a temperature of 60° C. The warm solution was poured into six Teflon-lined autoclaves and digested at 85° C., 100° C., and 150° C. for time periods ranging from 24 hours to 7 days.

The reaction products were dark brown-black solids and colorless mother liquors with an average pH of 4.65. The solids were filtered, washed with distilled water and dried in air. The products of the 85° C. and 100° C. reactions were found to be isostructural to hollandite based on XRD data. Optical microscopy showed these products to consist of the aggregates of micron-sized particulates often seen for substituted hollandites. Elemental analysis showed the metals to be present in the mole ratios $K_{1.075}Sn_{0.768}Mn_{7.232}$, consistent with the formulation of the hollandite structure. Representative XRD data are given in Table 12.

TABLE 12

| 2θ | d(Å) | Intensity |
|---|---|---|
| 12.61 | 7.01 | m |
| 17.91 | 4.95 | m |
| 28.34 | 3.15 | m |
| 37.32 | 2.41 | vs |

TABLE 12-continued

| 2θ | d(Å) | Intensity |
|---|---|---|
| 41.65 | 2.17 | m |
| 49.28 | 1.85 | m |

EXAMPLE 13

$Ba(MnO_4)_2$ (10.00 g) was dissolved in 75.00 g distilled water. Concentrated sulfuric acid (2.60 g) was added to this solution to precipitate $BaSO_4$. The resultant white $BaSO_4$ precipitate was filtered from the purple solution and the precipitate washed with 61.0 g of distilled water. In a separate vessel, 1.07 g $(NH_4)_2GeF_6$ was dissolved in 10.00 g distilled water and glacial acetic acid (8.64 g) was added to the resulting solution. This formed a white sol after 5 minutes of stirring. At this point 3.84 g $NH_4NO_3$ was added to the permanganate solution, followed by the addition of the ammonium hexafluorogermanate/acetic acid sol and the resulting mixture was heated to 84° C. The heat was then reduced and the solution was stirred for 20 minutes. After stirring, the pH was 1.72 at a temperature of 77° C. The warm solution was immediately distributed among 6 Teflon-lined autoclaves and digested at 85° C., 100° C., and 150° C. for periods of 24 hours to 7 days.

The products of the reactions were dark brown powders and colorless mother liquors which exhibited an averaged pH of 3.30. The solids were filtered, washed with distilled water, and dried at 125° C. Optical microscopy showed the product to consist of aggregates of particulates that were approximately 10 microns across. These particulates were in turn composed of bundles of fiber crystals. XRD data showed the products had the hollandite structure. Elemental analysis showed the metals to be present in the mole ratios $(NH_4)_{1.181}Ge0.267Mn7.733$, consistent with the formulation of the hollandite structure. Representative XRD data are given in Table 13.

TABLE 13

| 2θ | d(Å) | Intensity |
|---|---|---|
| 12.61 | 7.02 | s |
| 17.89 | 4.96 | m |
| 28.47 | 3.13 | m |
| 37.37 | 2.40 | vs |
| 41.71 | 2.16 | m |
| 49.48 | 1.84 | m |
| 55.61 | 1.65 | w |

EXAMPLE 14

$KMnO_4$ (15.00 g) was suspended in 150 g distilled water with stirring and heated. In a separate vessel, 2.40 g $(NH_4)_2SbF_5$ was dissolved in 22.0 g distilled water and 17.08 g glacial acetic acid was added to the resulting solution. When the permanganate solution reached 50° C., the ammonium pentafluoroantimonite/acetic acid solution was added to it dropwise in a time period of about 3 minutes. After the addition, when the solution had reached a temperature of 66° C., the heat applied to the reaction mixture was reduced. The mixture was stirred for about 30 minutes at the end of which the pH of the mixture was 3.62 at a temperature of 72° C. The warm solution was immediately distributed among six Teflon-lined autoclaves and digested at 85° C., 100° C., and 150° C. for time periods of 28 hours to 7 days.

The reaction products consisted of dark brown/black solids and colorless mother liquors which had an average pH of 4.70. The solids were filtered, washed thoroughly with distilled water, and dried at 125° C. Optical microscopy showed the 85° C. and 100° C. products to consist of aggregates of micron-sized particulates, which were themselves composed of small fibers packed together. XRD data showed the product to be isostructural to hollandite. Elemental analyses showed the metals to be present in the mole ratios $K_{0.996}Sb_{0.589}Mn_{7.411}$, consistent with the formulation of the hollandite structure. Representative XRD data are shown in Table 14.

TABLE 14

| $2\theta$ | d(Å) | Intensity |
|---|---|---|
| 12.57 | 7.04 | vs |
| 17.81 | 4.98 | s |
| 28.29 | 3.15 | vs |
| 37.19 | 2.42 | vs |
| 41.49 | 2.17 | m |
| 49.16 | 1.85 | m |
| 55.21 | 1.66 | w |
| 59.24 | 1.56 | m |

EXAMPLE 15

$KMnO_4$ (15.00 g) was suspended in 214.0 g distilled water. In a separate vessel, wet $Rh(NO_3)_3$ (3.91 g) was dissolved in 41.37 g distilled water and was added to the stirring permanganate suspension. Glacial acetic acid (12.21 g) was added to the reaction mixture, which had a pH of 2.90 after the addition. The reaction mixture was heated to 60° C. to insure that all solids were dissolved and then distributed among nine Teflon lined autoclaves while still warm. The filled reactors were digested at 100° C., 150° C., and 200° C. for time periods of 53 hours to 8 days.

The products of the 100° C. reactions were dark brown solids and colorless mother liquors of average pH 5.18. The solids were filtered, washed thoroughly with distilled water and dried in air. Optical microscopy revealed micron-sized aggregates of fibrous crystals. XRD data showed the product was isostructural with hollandite. SEM data revealed the fibrous morphology of the crystals, while the EDAX spot probe showed the presence of the metals K, Rh, and Mn in the crystals. Representative XRD data are given in Table 15.

TABLE 15

| $2\theta$ | d(Å) | Intensity |
|---|---|---|
| 12.66 | 6.99 | s |
| 17.96 | 4.93 | m |
| 28.61 | 3.12 | s |
| 37.46 | 2.40 | vs |
| 41.86 | 2.16 | m |
| 49.63 | 1.84 | m |
| 56.08 | 1.64 | w |
| 59.96 | 1.54 | m |
| 65.20 | 1.43 | w |

EXAMPLE 16

$KMnO_4$ (15.00 g) was suspended in 150.0 g distilled water and the resulting suspension was heated with a hotplate to help dissolve the solids. In a separate vessel ground $Ga(NO_3)_3$ (2.42 g) was dissolved in 21.2 g distilled water, to which there were added 17.2 g of glacial acetic acid and the resulting solution was stirred for about 15 minutes. When the permanganate suspension reached 57° C., the gallium nitrate/acetic acid solution was added, the heat was reduced and the reaction mixture stirred for about 30 minutes. At the end of this stirring period, the pH of the reaction mixture was 2.45 at a temperature of 66° C. The warm reaction mixture was immediately transferred to six Teflon-lined autoclaves, which were digested at 100° C., 150° C., and 200° C. for time periods ranging from 29 hours to 7 days.

The products of the 100° C. reactions were dark brown solids and colorless mother liquors of approximate pH 4.75. The product solids were filtered from the mother liquors, washed thoroughly with distilled water and dried at 125° C. Optical Microscopy revealed the product consisted of aggregates of micron-sized particulates often seen in the substituted hollandites presented in this application. XRD data showed the product to be isostructural to hollandite. Representative XRD data are presented in Table 16.

TABLE 16

| $2\theta$ | d(Å) | Intensity |
|---|---|---|
| 12.71 | 6.96 | m |
| 18.00 | 4.92 | m |
| 28.68 | 3.11 | s |
| 37.51 | 2.40 | vs |
| 41.90 | 2.15 | m |
| 49.69 | 1.83 | m |
| 56.22 | 1.63 | w |

EXAMPLE 17

Samples from Examples 2, 6, 9 and 10 were tested as follows for their ability to dehydrogenate propane. A 0.1 g sample of the respective composition was placed in a reactor and heated to 300° C. Helium was flowed through the reactor at a rate of 39 cc/min. At ½ hour intervals, a 25 $\mu$L pulse of propane was injected. The effluent from the reactor was analyzed by gas chromatography to determine the total conversion of propane and the selectivity to propylene, carbon monoxide and carbon dioxide. These results are presented in Table 17. The conversions presented are those after several pulses and where chosen such that the overall conversion was approximately the same for each sample.

TABLE 17

Activity of Compositions for Propane Dehydrogenation

| SAMPLE ID | CONVERSION (%) | SELECTIVITY TO PROPYLENE | SELECTIVITY TO CO | SELECTIVITY TO $CO_2$ |
|---|---|---|---|---|
| $K_{1.12}Mn_8O_{16}$(Ex. 1) | 21 | 2 | 1 | 97 |
| $K_{0.72}Al_{0.74}Mn_{6.65}V_{0.61}$ (Ex. 9) | 47.5 | 2.5 | 6.5 | 91 |
| $K_{1.13}Cr_{0.46}Mn_{7.54}O_{16}$(Ex. 6) | 35 | 5 | 0 | 95 |
| $K_{1.02}V_{0.80}Mn_{7.20}O_{16}$(Ex. 10) | 21 | 9 | 18.5 | 72.5 |

The data presented above show that substituted hollandites have increased selectivity to propylene versus the unsubstituted hollandite. Selectivity to propylene is desirable and indicates that these compositions would be good ammoxidation catalysts.

I claim as my invention:

1. A hydrocarbon conversion process comprising contacting a hydrocarbon feed with a catalyst under hydrocarbon conversion conditions to give a converted product, the catalyst comprising a crystalline metallo manganese oxide composition having a three-dimensional framework structure, an intracrystalline pore system and an empirical chemical composition on an anhydrous basis expressed by the formula:

$$A_yMn_{8-x}M_xO_{16}$$

where A is a templating agent selected from alkali metals, alkaline earth metals and ammonium ion, "y" is the moles of A and varies from the group consisting of about 0.5 to about 2.0, M is a metal selected from the group consisting of chromium, zirconium, tin, platinum, rhodium, niobium, tantalum, vanadium, antimony, ruthenium, gallium and germanium, "x" is the moles of M and varies from about 0.01 to about 4.0 and characterized in that manganese has a valence of +3, or +4, M has a valence of +3, +4 or +5 and the composition has the hollandite structure.

2. The process of claim 1 where the hydrocarbon conversion process is oxydehydrogenation.

3. The process of claim 1 where the hydrocarbon conversion process is ammoxidation.

4. The process of claim 1 where the hydrocarbon conversion process is the oxidation of alcohols to ketones.

5. The process of claim 1 where M is selected from the group consisting of rhodium, gallium, chromium and mixtures thereof and "x" varies from about 0.01 to about 1.25.

6. The process of claim 1 where M is selected from the group consisting of niobium, tantalum, vanadium, antimony and mixtures thereof and "x" varies from about 0.01 to about 1.0.

7. The process of claim 1 where M is selected from the group consisting of zirconium, tin, platinum, ruthenium, germanium and mixtures thereof and "x" varies from about 0.01 to about 4.0.

8. The process of claim 1 where the composition has an empirical formula of $$A_yMn_{8-x}M^{3+}{}_dM^{4+}{}_eM^{5+}{}_fO_{16}$$

where "d", "e" and "f" represent the moles of $M^{3+}$, $M^{4+}$ and $M^{5+}$ respectively and d+e+f=x and the amount of each metal is governed by the following equations:

(i) when f=0; d+e=x and d<1.25;

(ii) when e=0; d+f=x; d−f<1.25 when d>f; f−d<1.0 when f>d;

(iii) when d=0; e+f=x and f<1.0;

(iv) d+e+f x; d=f<1.25 when d>f, f−d<1.0 when f>d.

9. A hydrocarbon conversion process comprising contacting a hydrocarbon feed with a catalyst under hydrocarbon conversion conditions to give a converted product, the catalyst comprising a crystalline metallo manganese oxide composition having a three-dimensional framework structure, an intracrystalline pore system and an empirical chemical composition on an anhydrous basis expressed by the formula $$A_yMn_{8-x}M1_rM2_sO_{16}$$

where A is a templating agent selected from the group consisting of alkali metals, alkaline earth metals and ammonium ion, "y" is the moles of A and varies from about 0.5 to about 2.0, M1 is a metal selected from the group consisting of aluminum, iron, titanium and mixtures thereof, M2 is a metal selected from the group consisting of zirconium, tin, platinum, rhodium, niobium, tantalum, vanadium, antimony, ruthenium, gallium, germanium, and mixtures thereof, "r" and "s" are the moles of M1 and M2 respectively and r+s=x; "x" varies from 0.01 to 4.0; "h" and "k" represent the moles of a +3 and a +4 M1 metal respectively and h+k=r and the relative moles of M1 and M2 are described by:

(i) when M2 is a +3 metal or a combination of a +3 and a +4 metal and "v" and "t" are the moles of the +3 and +4 metals respectively and v+t=s, then h+v<1.25;

(ii) when M2 is a +4 metal, then h<1.25;

(iii) when M2 is a +5 or a mixture of a +4 and a +5 metal and "t" and "u" are the moles of the +4 and +5 metals respectively and t+u=s, then h−u<1.25 when h>u; u−h<1.0 when u>h;

(iv) M2 is a mixture of a +3, +4 and a +5 metal and "v", "t" and "u" are the moles of the +3, +4 and +5 metal respectively and v+t+u=s, then (h+v)−u>1.25 when (h+v)>u;

u−(h+v)<1.0 when u>(h+v), and the composition has the hollandite structure.

10. The process of claim 9 where the hydrocarbon conversion process is oxydehydrogenation.

11. The process of claim 9 where the hydrocarbon conversion process is ammoxidation.

12. The process of claim 9 where the hydrocarbon conversion process is the oxidation of alcohols to ketones.

13. A process for reducing the cyanide concentration in an aqueous stream comprising contacting the aqueous stream with a catalyst in the presence of an oxidizing agent under acidic oxidation conditions thereby oxidizing the cyanide, the catalyst comprising a crystalline metallo manganese oxide composition having a three-dimensional framework structure, an intracrystalline pore system and an empirical chemical composition on an anhydrous basis expressed by the formula $A_yMn_{8-x}M_xO_{16}$ where A is a templating agent selected from the group consisting of alkali metals, alkaline earth metals and ammonium ion, "y" is the moles of A and varies from about 0.5 to about 2.0, M is a metal selected from the group consisting of chromium, zirconium, tin, platinum, rhodium, niobium, tantalum, vanadium, antimony, ruthenium, gallium and germanium, "x" is the moles of M and varies from about 0.01 to about 4.0 and characterized in that manganese has a valence of +3, or +4, M has a valence of +3, +4 or +5 and the composition has the hollandite structure.

14. The process of claim 13 where the acidic oxidation conditions include a temperature of about 20° C. to about 150° C., a pH of about 1 to about 6 and a pressure of atmospheric to about 2206 kPa.

15. The process of claim 13 where the oxidizing agent is oxygen.

16. The process of claim 13 where the composition has an empirical formula of $A_yMn_{8-x}M^{3+}_dM^{4+}_eM^{5+}_fO_{16}$ where "d", "e" and "f" represent the moles of $M^{3+}$, $M^{4+}$ and $M^{5+}$ respectively and d+e+f=x and the amount of each metal is governed by the following equations:

(i) when f=0; d+e=x and d<1.25;

(ii) when e=0; d+f=x; d−f<1.25 when d>f; f−d<1.0 when f>d;

(iii) when d=0; e+f=x and f<1.0;

(iv) d+e+f=x; d−f<1.25 when d>f; f−d<1.0 when f>d.

17. A process for reducing the cyanide concentration in an aqueous stream comprising contacting the aqueous stream with a catalyst in the presence of an oxidizing agent under acidic oxidation conditions thereby oxidizing the cyanide, the catalyst comprising a crystalline metallo manganese oxide composition having a three-dimensional framework structure, an intracrystalline pore system and an empirical chemical composition on an anhydrous basis expressed by the formula:

$A_yMn_{8-x}M1_rM2_sO_{16}$ where A is a templating agent selected from the group consisting of alkali metals, alkaline earth metals and ammonium ion, "y" is the moles of A and varies from about 0.5 to about 2.0, M1 is a metal selected from the group consisting of aluminum, iron, titanium and mixtures thereof, M2 is a metal selected from the group consisting of zirconium, tin, platinum, rhodium, niobium, tantalum, vanadium, antimony, ruthenium, gallium, germanium, and mixtures thereof, "r" and "s" are the moles of M1 and M2 respectively and r+s=x; "x" varies from 0.01 to 4.0; "h" and "k" represent the moles of a +3 and a +4 M1 metal respectively and h+k=r and the relative moles of M1 and M2 are described by:

(i) when M2 is a +3 metal or a combination of a +3 and a +4 metal and "v" and "t" are the moles of the +3 and +4 metals respectively and v+t=s, then h+v<1.25;

(ii) when M2 is a +4 metal, then h<1.25;

(iii) when M2 is a +5 or a mixture of a +4 and a +5 metal and "t" and "u" are the moles of the +4 and +5 metals respectively and t+u=s, then h−u<1.25 when h>u; u−h<1.0 when u>h;

(iv) M2 is a mixture of a +3, +4 and a +5 metal and "v", "t" and "u" are the moles of the +3, +4 and +5 metal respectively and v+t+u=s, then (h+v)−u>1.25 when (h+v)>u; u−(h+v)<1.0 when u>(h+v), and the composition has the hollandite structure.

18. The process of claim 17 where the acidic oxidation conditions include a temperature of about 20° C. to about 150° C., a pH of about 1 to about 6 and a pressure of atmospheric to about 2206 kPa.

19. The process of claim 17 where the oxidizing agent is oxygen.

* * * * *

UNITED STATES PATENT AND TRADEMARK OFFICE
CERTIFICATE OF CORRECTION

PATENT NO: 5,772,898
DATED: June 30, 1998
INVENTOR(S): Gregory J. Lewis

It is certified that error appears in the above-identified patent and that said Letters Patent is hereby corrected as shown below:

In column 17, line 31 insert between from and alkali --the group consisting of--.

In column 17, line 33, delete "the group consisting of".

Signed and Sealed this

Twenty-fifth Day of August, 1998

Attest:

BRUCE LEHMAN

*Attesting Officer*    *Commissioner of Patents and Trademarks*